UNITED STATES PATENT OFFICE.

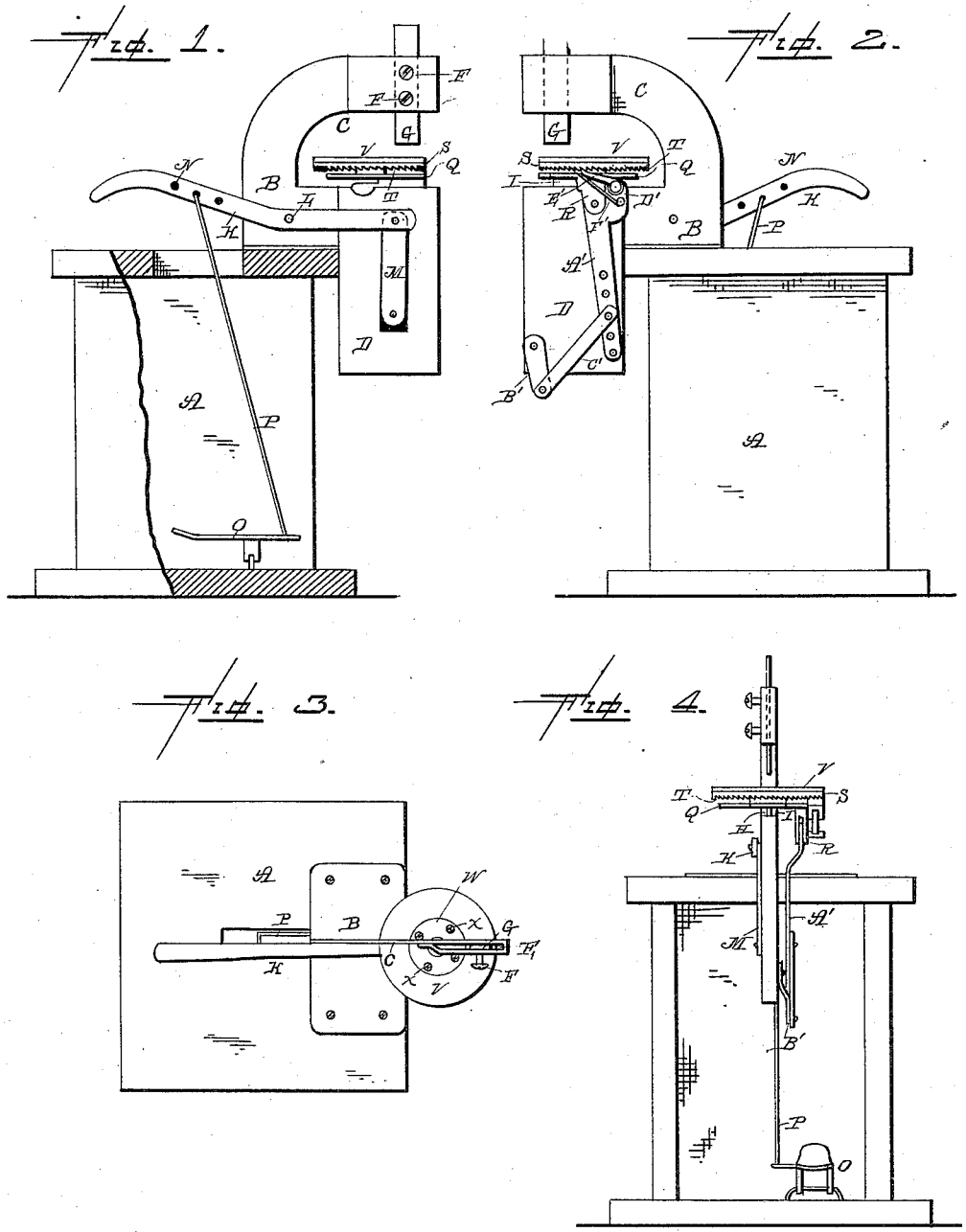

HENRY A. BEHN, OF UNION, NEW JERSEY.

MACHINE FOR CUTTING BUTTON-HOLES.

SPECIFICATION forming part of Letters Patent No. 299,329, dated May 27, 1884.

Application filed March 10, 1884. (No model.)

*To all whom it may concern:*

Be it known that I, HENRY A. BEHN, of the town of Union, in the county of Hudson and State of New Jersey, have invented certain new and useful Improvements in Machines for Cutting Button-Holes; and I do hereby declare the following to be a full, clear, and exact description of the invention, such as will enable others skilled in the art to which it pertains to make and use it, reference being had to the accompanying drawings, which form part of this specification.

My invention relates to an improvement in machines for cutting button-holes; and it consists in the combination of a cutter-blade that is supported vertically in a bracket with a reciprocating standard that plays vertically in ways formed in the lower extension of the bracket, a circular plate that is secured horizontally on the upper end of the reciprocating standard, a lever that is connected to the standard on one side for the purpose of actuating it, and a mechanism for giving the circular plate a partial rotation as it recedes from the cutting-blade, as will be more fully set forth hereinafter.

Figure 1 is a side elevation of my invention, a portion of the casing being broken away, so as to show the operating-pedal. Fig. 2 is a similar view taken from the opposite side from that shown in Fig. 1. Fig. 3 is a top plan view. Fig. 4 is a front elevation.

A represents a suitable box, frame, or table, and B represents a bracket secured thereto on one side. This bracket has an outwardly-curved arm, C, and a downward extension, D, as shown.

In the outer end of the arm C is formed a vertical slot, E, and through one of the sides of the slot project the set-screws F, that secure a cutting-blade, G, rigidly in position in the outer end of the bracket. The downward extension D has a similar slot or way, H, formed vertically in it in a vertical line with the slot E, and in this slot H is placed a standard, I. This standard is reciprocated vertically by means of a lever, K, which is fulcrumed to the bracket at L, and has its outer end connected to the standard I by means of the link M. The inner extremity of the lever K is provided with a series of perforations, N.

O represents a pedal that is pivoted in the bottom of the case A, and is connected to the lever K by means of the rod P, the upper end of which rod is secured in either of the holes N. By this means the distance that the standard H reciprocates may be regulated, as will be readily understood. The upper end of the standard H is provided with a flat circular table, Q, which has a depending ear, R, on the side opposite the lever K. Pivoted centrally on the upper side of the table Q is a circular disk, S, which is provided on its under side, at its periphery, with the ratchet-teeth T.

To the upper side of the disk S is secured a circular disk, V, of like diameter, which disk V is preferably made of lead or other soft metal, but which may be made of any suitable substance. The disk V is secured to the disk S by means of the circular collar W and screws X. It will be seen that when the inner end of the lever K is depressed the disk V will be raised, so that the sharp end of the cutting-blade will come in contact with its upper side on its inner edge, as at Fig. 1. Cloth held against the blade G will thus have a button-hole cut in it by the impact of the disk V, when the inner end of the lever K is depressed, as will be readily understood.

In order to cause the disks S and V to partially rotate as they descend, for the purpose of moving the disk V a sufficient distance to present a new surface to the blade, I provide a lever, A', which is pivoted at its upper end to the ear R, and which is connected at its lower end to a bracket, B', secured to the lower inner end of the extension D by means of a connecting-rod, C'. The upper end of the lever A' is provided with an upper outer extension, D', to which is pivoted a pawl, E', which engages with the ratchet-teeth T. A spring, F', presses the pawl into the teeth. By this construction it will be readily seen that when the inner end of the lever K is elevated the disk S will be given a partial rotation.

In order to regulate the degree of rotation of the disks, I provide a series of perforations, G', in the lower end of the lever A', as shown at Fig. 1. When the connecting-rod C is secured in the upper one of these perforations, the rotation will be slight; but it can be increased at will by securing the inner end of the lever C' in one of the lower perforations.

Having thus described my invention, I claim—

1. The combination of the curved arm C and rigid cutter G with a vertically-moving table and an operating mechanism, substantially as shown, for both raising the table and revolving it, substantially as described.

2. The combination of the rigid cutter, a vertically moving and revolving table, a standard on which the table is placed, an operating-lever, and a mechanism for revolving the table, substantially as shown.

3. The combination of the table, the two extensions C D, the standard I, which is moved vertically by the operating-lever, the revolving table, the pawl-and-ratchet mechanism for causing the table to revolve, and the stationary cutter, substantially as set forth.

4. The combination of the vertically moving and revolving table, the standard I, lever K, and link M with levers A' B', connecting-rod C', and spring-pawls and a stationary cutter, substantially as specified.

5. The combination of the bracket B, having extensions C D and grooves or ways E H, with the cutting-blade G, standard H, standard I, disk S, (having teeth T,) pivoted thereon, lever K, link M, lever D', link C', and pawl E', substantially as shown and described.

In testimony whereof I affix my signature in presence of two witnesses.

H. A. BEHN.

Witnesses:
FREDERICK C. WIENKEN,
ALBERT KNOCK.